United States Patent [19]

Brandenstein

[11] Patent Number: 4,712,928
[45] Date of Patent: Dec. 15, 1987

[54] RING FASTENER FOR MACHINE PARTS

[75] Inventor: Manfred Brandenstein, Eussenheim, Fed. Rep. of Germany

[73] Assignee: SKF Kugallagerfabriken, Schweinfurt, Fed. Rep. of Germany

[21] Appl. No.: 895,426

[22] Filed: Aug. 11, 1986

Related U.S. Application Data

[63] Continuation-in-part of Ser. No. 583,379, Feb. 24, 1984, abandoned.

[30] Foreign Application Priority Data

Mar. 31, 1983 [DE] Fed. Rep. of Germany ... 8309591[U]

[51] Int. Cl.$^4$ .............................................. F16C 35/00
[52] U.S. Cl. ..................................... 384/538; 384/903; 411/151; 411/353; 411/517; 403/DIG. 7
[58] Field of Search ............... 411/517, 519, 518, 530, 411/521, 353, 151, 152, 157, 47, 48; 403/326, DIG. 7; 384/539, 538, 585, 537, 903; 277/222

[56] References Cited

U.S. PATENT DOCUMENTS

| 960,926 | 6/1910 | Hoops, Jr. | 411/353 X |
|---|---|---|---|
| 1,043,298 | 11/1912 | Clark | 411/517 X |
| 1,470,113 | 10/1923 | Davis | 277/222 |
| 1,709,933 | 4/1929 | Cowan | 411/152 |
| 1,908,215 | 5/1933 | Berge | 411/157 X |
| 2,014,231 | 9/1935 | Garrett | 411/157 X |
| 2,184,252 | 12/1939 | Garrett et al. | 411/152 |
| 2,476,586 | 7/1949 | Darash | 411/519 |
| 2,867,824 | 1/1959 | O'Connor | 411/157 X |
| 3,386,347 | 6/1968 | Bachle | 411/517 X |
| 3,460,427 | 8/1969 | Baumgarten | 411/518 |
| 3,477,335 | 11/1969 | Gold et al. | 411/8 |
| 3,752,515 | 8/1973 | Oaks et al. | 411/517 X |
| 4,189,161 | 2/1980 | Grimm | 277/222 X |

FOREIGN PATENT DOCUMENTS

| 489221 | 1/1930 | Fed. Rep. of Germany | 411/152 |
|---|---|---|---|
| 221093 | 8/1942 | Switzerland | 411/157 |
| 278558 | 10/1927 | United Kingdom | 411/152 |
| 359836 | 10/1931 | United Kingdom | 411/518 |

Primary Examiner—Kenneth J. Dorner
Assistant Examiner—Rodney M. Lindsey
Attorney, Agent, or Firm—Eugene E. Renz, Jr.

[57] ABSTRACT

The combination comprising a machine element, a tubular member and a ring fastener for mounting the machine element in the circular bore of the tubular member, the ring fastener being in the form of a split annular ring member having confronting end faces, the ring member being of a diameter slightly greater than the diameter of a bore in the tubular member, each end face having a first axial portion extending generally parallel to the axis of the ring member and a second inclined portion extending at a predetermined angle to the axis of the ring member. The first and second portions of the end faces normally align and confront in the relaxed condition of the ring member and are displaceable axially relative to one another for insertion in the bore of the tubular member and after seating in the bore displaceable in an opposite axial direction by application of an axial force adjacent the axial end faces. The end faces coact and move from a partially overlapped position wherein the edge of the first surface of one end face confronts and engages the second surface of the other end face to a circumferentially aligned position resulting in the circumferential expansion of the ring such that a radially directed friction self-locking effect between the ring and the bore is achieved.

3 Claims, 4 Drawing Figures

RING FASTENER FOR MACHINE PARTS

This is a continuation in part of application Ser. No. 583,379 filed Feb. 24, 1984, now abandoned.

FIELD OF THE INVENTION

The present invention relates to ring fasteners for securing machine elements.

BACKGROUND OF THE INVENTION

Ring-type fasteners are not new per se. In accordance with a known prior art ring fastener shown in West German Registered Design No. 1,947,760, the fastener serves to secure needle bearing bushings against axial displacement in the fork arms of a universal joint. More specifically, the bore of the fork arm is of conical configuration and cooperates on insertion of the ring fastener with a correspondingly slanted lateral surface of the needle bearing bushing. Thus, when pressed into place, the ring fastener which is provided with a through slot, expands and spreads out over the conical surfaces and tensions itself radially against the bore in the fork arm of the universal joint. This arrangement has several disadvantages and drawbacks. For example, forming conical surfaces on the needle bearing bushing and on the ring fastener is somewhat complicated and in the present instance may be described as being extremely complicated by reason of the fact that they must be complemented or fitted to one another within very narrow tolerance ranges so that the ring fastener expands and tensions itself uniformly against the surface of the bore in the fork arm of the universal joint. Additionally, it has been found that over a period of use, these prior ring fasteners tend to loosen since the conical surfaces tend to slip relative to one another. In summary, therefore, this prior device is rather expensive and does not provide a totally reliable securing or attaching means.

SUMMARY OF THE INVENTION

With the foregoing in mind, it is an object of the present invention to provide a ring fastener characterized by novel features of construction and arrangement which is easy and economical to manufacture and provides a reliable fastening means without special fitting to the machine part to be secured in place. To this end, the ring fastener of the present invention is adapted to be press fitted into a smooth cylindrical opening in a machine part or the like and in accordance with the principal embodiment, the ring fastener is a split annulus wherein each of the confronting end faces of the ring comprise an axial section and a slanted or biased section. This design of the end faces or slot surfaces of the ring provides an entry ramp when the ring fastener is set or pressed into place. For example, by this arrangement, the ring, which normally has an outer peripheral dimension suitable to provide a press fit in the opening in the machine element is first positioned in the opening with its end faces offset axially relative to one another. In this manner, the end sections can overlap to a significant degree and the ring temporarily assumes the form of a helix for easy insertion into the opening in the machine part. In other words, the ring contracts easily when inserted into the opening and can be adjusted relative to the opening without difficulty. In the offset, overlapping position of the end faces, the radial edge of the slot surface of one end of the ring confronts and engages the slanted or biased end surface of the other end face of the ring. Now when the ends are pressed axially relative to one another, the radial edge slides along the slanted surface causing the entire ring to expand until the radial edge aligns with the axial portion of the opposing ring end face at which point the process of expansion of the ring is completed. As the ends of the rings are further moved axially to a fully seated position, the end surfaces continue to slide relative to one another until the end faces are completely aligned and the ring shape is completely restored. In this position, a self-locking effect develops at the end faces of the ring which resists unintentional loosening. Further, in this position the ring fastener contacts the bore surface of the opening in the machine part under great tension and provides the reliability of a closed loop design which otherwise could only be obtained at considerable cost by matching the ring periphery to the bore diameter to provide a press fit.

Another feature of the ring fastener of the present invention which has proved to be especially advantageous in practical tests is the specific configuration and arrangement of the complementary, coacting end faces of the ring section. For example, it is preferred that the axial section of the slot comprise one-third the width of the ring and that the biased or slanted section form an angle of about 10° to the axial section (schematically illustrated in FIGS. 2-4). These features provide in most applications sufficient expansion for force locking contact with the peripheral surface of the opening in the machine part and also ensures sufficient resistance against displacement and, therefore, reliability in the installed state.

In accordance with another feature of the present invention, the outer peripheral surface of the ring is provided with a saw-tooth profile in transverse cross section and it is also preferred to harden the ring. The outer peripheral surface of the ring, for example, can have a number of parallel annular grooves which define annular projections between the grooves with a saw-tooth profile. Thus, when the ring is expanded under the pressure of being forced into place, the projections press into the smooth peripheral surface of the opening in the machine part and thereby increase the axial strength of the attachment. In some applications, it is preferred that the radial flanks of the projections are pointed in the direction of the machine part and in this instance the inward pressing teeth produce a slight axial movement which strengthens the contact against the machine part. Alternatively, the sloping flanks can point toward the machine part which produces an increased level of security against axial loosening of the ring away from the machine part. By hardening the fastening ring, a deeper penetration of the projections into the peripheral surface results and improves the sliding properties in the region of the confronting end faces when the ring is pressed into place.

BRIEF DESCRIPTION OF THE DRAWINGS

These and other objects of the present invention and the various features and details of the operation and construction thereof are hereinafter more fully set forth with reference to the accompanying drawings, wherein.

DESCRIPTION OF THE PREFERRED EMBODIMENT

Figure 1:
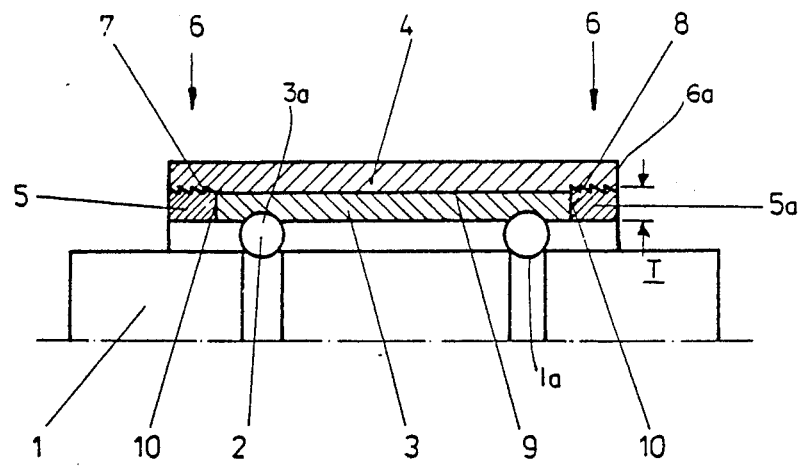
FIG. 1 shows a partial longitudinal sectional view of a bearing unit secured in a bore of a sleeve member by means of ring fasteners in accordance with the present invention.

Referring now to the drawings and particularly FIG. 1 thereof, the ring fastener of the present invention is shown in combination with a bearing assembly consisting of a shaft 1 rotatably mounted in an outer ring sleeve 3 by two rows of balls 2. The shaft 1 and the outer ring 3 have a pair of axially spaced inner and outer raceways 1a and 3a respectively for the rows of balls 2. In the present instance, the outer ring 3 is seated or nested in a tubular housing 4 and is secured in place therein at both axial ends by means of two ring fasteners 5, 5a, in accordance with the present invention.

The ring fastener 5 shown on the left has a saw-toothed profile 6 with outwardly directed radial flanks 7. By this configuration, an increased degree of locking against loosening of the ring fastener 5 toward the outside is provided. The ring fastener 5a shown on the right is in contrast provided with a saw-toothed profile 6a having sloping conical flanks 8 are directed axially outwardly. Thus, the ring 5a produces a firmer contact with the lateral surface 10 of the outer ring by reason of the penetration of the radially projecting teeth into the surface 9 of the bore as the ring is pressed into place.

Figures 2, 3, 4:
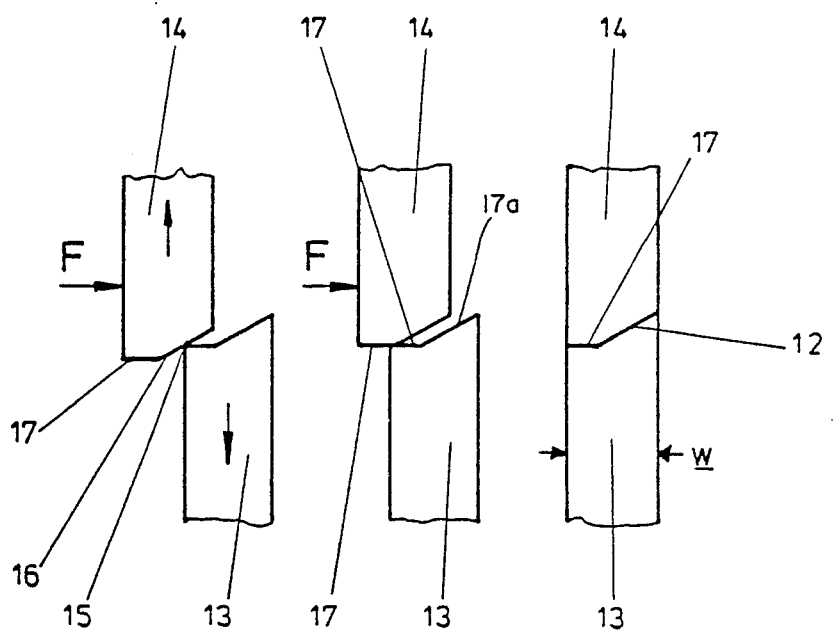
FIGS. 2, 3 and 4 show enlarged fragmentary views of the complementary end portions of the fastening ring during an assembly operation.

In the present instance, the ring fasteners are split rings wherein as illustrated in FIGS. 2, 3 and 4, the confronting first end faces or surfaces 13 and 14 are shaped to provide planar axially extending surfaces 17, 17a extending approximately one-third the width of the ring and second surfaces or slanted or inclined sections 16, 16a disposed at an angle to the axial surfaces 17, 17a.

When the ring fastener is initially assembled, the end surfaces 13, 14 of the ring fastener partially overlap as illustrated in FIG. 2. In this position, the inner circumferential edge 15 of the axial surface 17a rests against the slanted surface 16 of the opposing end section 14. As the pressing force is increased during assembly preferably by exerting an axial force F on the end section 14, the edge 15 slides over the slanted surface 16 until as shown in FIG. 3, the transition to the axial surface 17 is reached. During this process, the ring 5 expands by reason of the fact that the end sections 13, 14 are displaced relative to one another in the circumferential direction indicated by the arrows $R_1$ and $R_2$. Finally, the axial surfaces 17, 17a of the end sections 13, 14 reach the position shown in FIG. 4 wherein the final seated position of the ring fastener 5 is achieved and the ends are aligned in a circumferential direction to produce a closed ring. The engagement of the axial surfaces 17, 17a produce a frictional self-locking effect.

Even though specific embodiments of ring fasteners have been illustrated and described herein, it is not intended to limit the invention and changes and modifications may be made therein within the scope of the following claims. For example, the relative length ratio of the axial section to the slanted section of each end face and the particular angular disposition of the slanted section may be selectively varied depending on the requirements of a particular application. Additionally, it may be advantageous to utilize a ring fastener comprised of two semi-circular segments wherein the confronting ends of each segment are provided with the locking configuration illustrated in FIGS. 2, 3 and 4.

The ring fastener of the present invention is particularly useful to seat the outer ring of a bearing assembly in the bore of a housing or the like. Broadly defined, the ring fastener is a split annulus wherein the confronting end faces include complementary first axial portions aligned with the axis of the ring in the quiescent state and inclined second portions offset angularly relative to the axial portion. By this configuration, the ring which is normally of a diameter slightly greater than the bore diameter of the housing is positioned so that the end faces are offset as shown in FIG. 2 to permit easy insertion of the ring in the bore and then a force is applied adjacent the end faces whereby the radial edge of one end face engages the inclined second portion of the other end face and wherein continued application of force results in return of the end faces to the locked position shown in FIG. 4. This action produces circumferential expansion of the ring and produces a radially directed friction locking effect between the ring and the bore. The ring fastener of the present invention is of comparatively thin cross section in comparison to its diameter so that it can easily expand and contract radially and thus the ring fastener is characterized by radial elasticity. Preferably the thickness or radial cross section T of the ring fastener is less than one-fifth of the diameter D. The ring fastener of the present invention provides a simple and effective means for locking parts in place without the need for critical tolerance considerations which is the case in normal continuous ring press fit assemblies.

What is claimed is:

1. The combination comprising a machine element, a tubular member and a ring fastener mounting the machine element in the circular bore of the tubular member, said ring fastener being in the form of a split annular ring member having a width, an axis, a lateral surface of saw tooth profile in cross section, a predetermined radial thickness and diametrically confronting end faces, the ring member being of a diameter slightly greater than the diameter of said bore in the tubular member, each end face having a first axial section extending generally parallel to said axis of the ring member and a second inclined section extending at a predetermined angle to the axis of the ring member, said first and second sections of the end faces normally aligned and confronting in a relaxed condition of the ring member and displaceable axially relative to one another for insertion of the ring member in the bore of the tubular member and after seating of the ring member in the bore displaceable in an opposite axial direction by application of an axial force adjacent the axial end faces, the end faces coact and move from a partially overlapped position wherein the edge of the first surface of one end face confronts and engages the second surface of the other end face to a circumferentially aligned position resulting in the circumferential expansion of said ring such that a radially directed friction self-locking effect between said ring member and said bore is achieved.

2. The combination according to claim 1, characterized in that the length of the axial section is equal to one-third the width of the ring fastener.

3. The combination according to claim 1, characterized in that the inclined section forms an angle of 10° to the axial section.

* * * * *